United States Patent [19]

Chang

[11] Patent Number: 5,245,179

[45] Date of Patent: Sep. 14, 1993

[54] CYLINDRICAL COLOR FILTER DRIVER FOR AN OPTICAL READER

[75] Inventor: Shih-Chung Chang, Hsinchu, Taiwan

[73] Assignee: Umax Data System Inc., Hsinchu, Taiwan

[21] Appl. No.: 957,834

[22] Filed: Oct. 8, 1992

[51] Int. Cl.$^5$ ............................................... G01J 3/50
[52] U.S. Cl. ..................................... 250/226; 356/418
[58] Field of Search ............... 250/226; 356/416–419; 358/75, 300; 359/889, 891

[56] References Cited

U.S. PATENT DOCUMENTS

| | | | |
|---|---|---|---|
| 2,406,318 | 8/1946 | Brace | 389/889 |
| 3,492,478 | 1/1970 | Smith | 359/889 |
| 4,804,271 | 2/1989 | Cammann | 356/418 |
| 5,184,253 | 2/1993 | Hwang | 359/889 |

Primary Examiner—David C. Nelms
Assistant Examiner—S. B. Allen
Attorney, Agent, or Firm—Lowe, Price, LeBlanc & Becker

[57] ABSTRACT

A compact, high-speed, high resolution, low-cost color filter driver for use in a color optical reader. The image of a document is reflected through a cylindrical color filter assembly rotated by a motor, causing a charge coupled device to be exposed to the light three times (red, blue, green) as the motor was rotated through a half run, and the document scanning portion moves ahead for one step. The color image of the document is reproduced by repeating the aforesaid procedure again and again through the operation of the single color charge coupled device and the cylindrical color filter assembly.

3 Claims, 7 Drawing Sheets

CYLINDRICAL COLOR FILTER DRIVER FOR AN OPTICAL READER

BACKGROUND OF THE INVENTION

The present invention relates to a cylindrical color filter driver for an optical reader which utilizes a motor to rotate a cylindrical color filter assembly for permitting the color image of a document to be reproduced through a single color charge coupled device.

Figure 1:
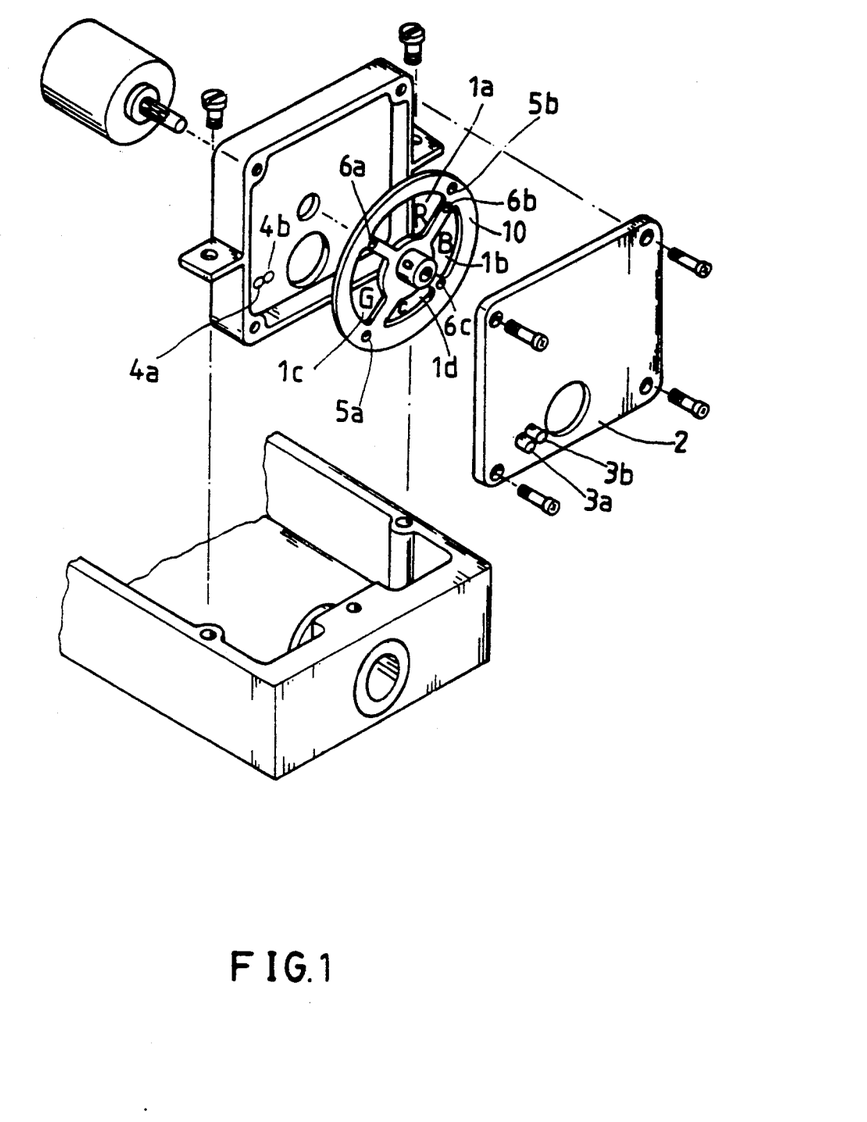
FIG. 1 is an exploded view of a rotary wheel type color filter driver according to the prior art.
Figure 2:
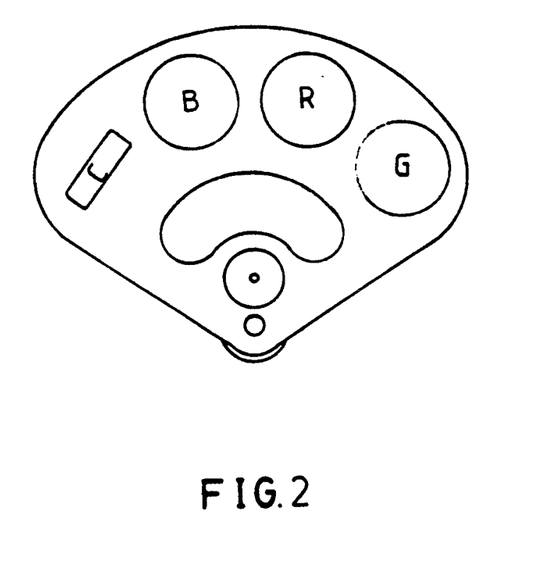
FIG. 2 is a front view of a sector disk type color filter driver according to the prior art.
Figure 3:
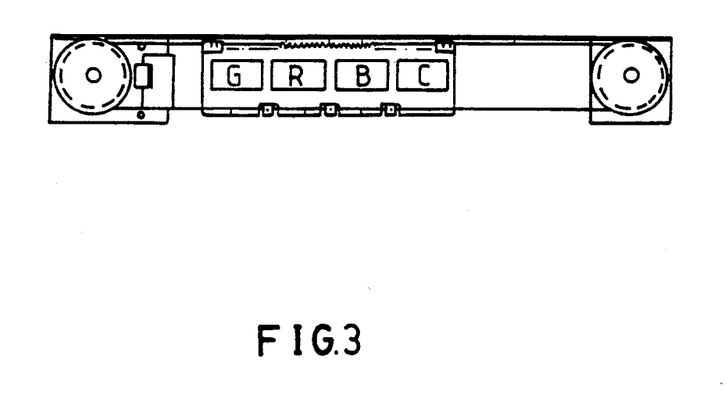
FIG. 3 is a linear color filter driver according to the prior art.

Various color filter drivers are known and widely used in color readers. These color filter drivers include rotary wheel type color filter drivers, sector disk type color filter drivers and linear color filter drivers. However, these color filter drivers are still not satisfactory in function. FIG. 1 illustrates a rotary wheel type of color filter driver in which the color wheel which is referenced as 10 has red, blue and green color filters 1a,1b,1c and a transparent window 1d arranged around a circle, the top cover which is referenced as 2 has two LEDs (light emitting diodes) 3a, 3b respectively aligned with two photo detectors 4a,4b. Rotating the color wheel 10 causes light holes 6a,6b,6c to be respectively aligned with one LED 3b and one photo detector 4b at different times. Output signals of the photo detectors 4a,4b are transmitted to a signal processor so as to provide a respective start signal for each scanning and a respective start signal for red, green and blue scanning mode. This structure of color filter driver is expensive to manufacture, requires much installation space and provides low resolution performance. Because the red, blue and green color filters provide different light transmission rates, the charged couple device will be exposed to the different intensity of light during a continuous scanning of the primary colors, and therefore the signal data processing technique becomes complicated. Furthermore, executing a synchronizing control takes much time, and therefore the scanning speed can be not improved. FIG. 2 illustrates a sector disk type color filter driver. This structure of sector color filter driver still requires much installation space. Because it utilizes a reversible motor to alternatively rotate the sector color filter assembly back and forth, the cost of the motor is expensive, and the operation of the motor is difficult to control accurately. Furthermore, the scanning speed can not be improved because the sector color filter assembly is driven to make a reciprocating motion. FIG. 3 illustrates a linear color filter driver which utilizes a reversible motor to alternatively move a color filter assembly back and forth through a linear source. This structure of linear color filter driver is inexpensive to manufacture and requires much installation space. The reciprocating motion of the color filter assembly can not improve the scanning speed.

SUMMARY OF THE INVENTION

The present invention eliminates the aforesaid disadvantages. It is therefore an object of the present invention to provide a cylindrical color filter driver which is compact and lightweight. It is another object of the present invention to provide a cylindrical color filter driver which provides a high resolution performance. It is still another object of the present invention to provide a cylindrical color filter driver which is inexpensive to manufacture.

According to the present invention, a cylindrical color filter driver includes a cylinder having red, blue and green color filters respectively covered on three spaced faces thereof alternatively separated by three spaced openings on the other three spaced faces thereof; a motor having an output shaft coupled to the cylinder at one end and controlled to rotate the cylinder on a mounting plate; and a position detector to detect reflective signals produced by reflective spots on the cylinder for controlling the revolving speed of the motor, the standard exposure point.

BRIEF DESCRIPTION OF THE DRAWINGS

FIG. 4b is a perspective view of the hexagonal cylinder of FIG. 4a;

DETAILED DESCRIPTION OF THE PREFERRED EMBODIMENTS

Figure 4A:
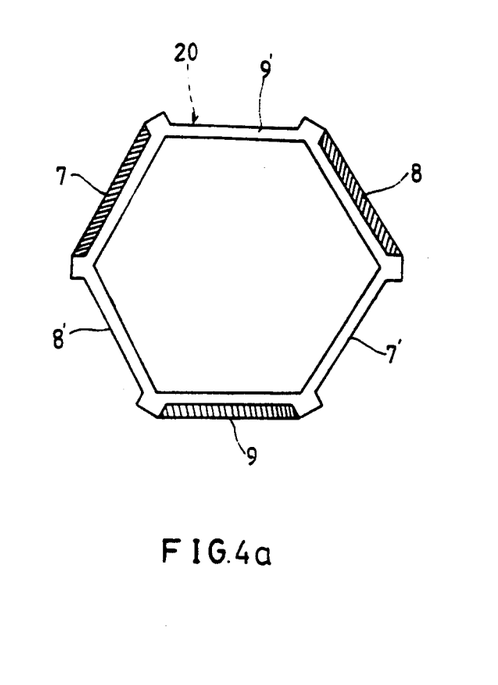
FIG. 4a is an end view of a hexagonal cylinder according to the present invention, showing three color filters covered on three spaces sides thereof equiangularly separated by the other three open sides thereof.
Figure 4B:
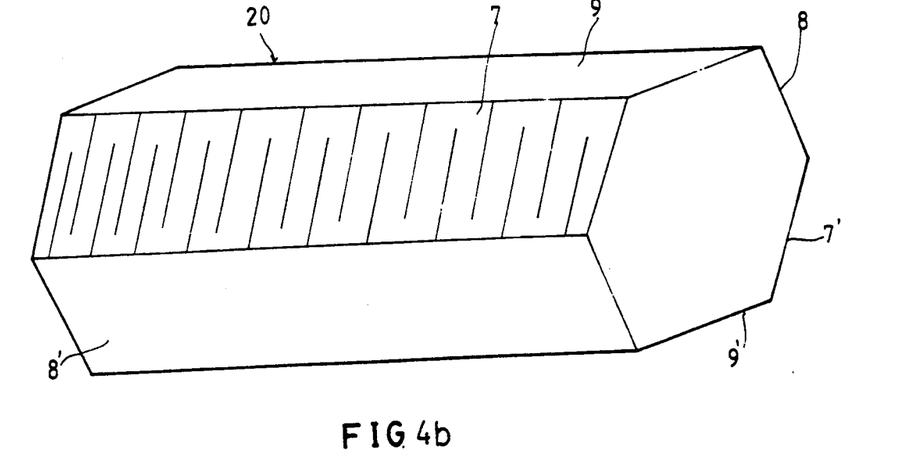

Referring to FIGS. 4a and 4b, the cylindrical color filter assembly 20 is made in the shape of a hexagonal prism having three spaced sides 7,8,9 respectively mounted with red, blue and green color filters and the other three spaced sides 7',8',9' opened. Therefore, the red, blue and green color filters are equiangularly spaced from one another by the open sides 7',8',9'.

Figure 5:
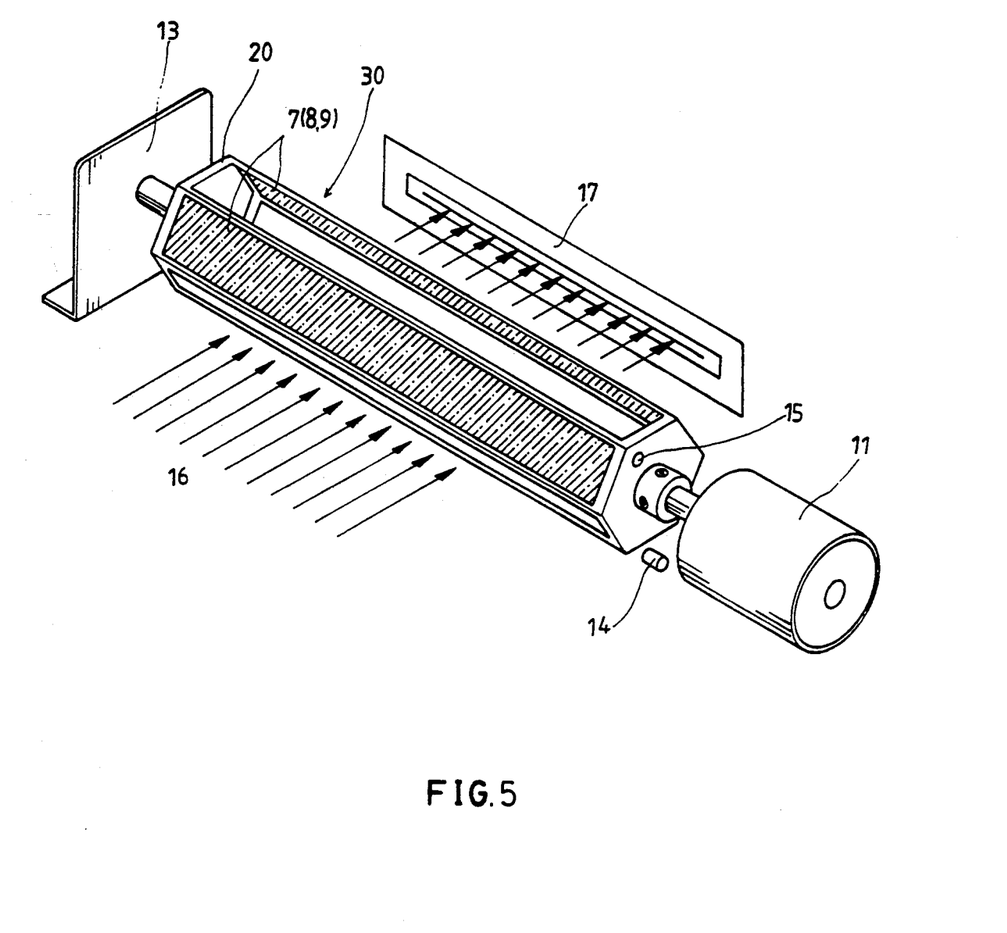
FIG. 5 illustrates a cylindrical color filter driver embodying the present invention in which a step motor is used to drive a cylindrical color filter assembly.

Referring to FIG. 5, the cylindrical color filter driver 30 includes a step motor 11 to rotate the cylindrical color filter assembly 20. The cylindrical color filter assembly 20 has one end revolvably coupled to a mounting plate 13 and an opposite end coupled to the output shaft of the step motor 11. Therefore, the cylindrical color filter assembly 20 can be rotated by the step motor 11. As the cylindrical color filter assembly 20 is rotated, the light of light source (not shown) passes through the color filter 7, 8 or 9 and comes into contact with a CCD (charge coupled device) 17. Each time the step motor 11 has been rotated through a half run, the CCD 17 was exposed to the light three times (red, blue, green), and the color document being scanned was moved for one step. By means of repeating this procedure again and again, the scanning of the color image of the color document is completed through the single color CCD 17 and the cylindrical color filter assembly 20. As the cylindrical color filter assembly 20 has been rotated through one run, a photoelectric position detec- tor 14 detects a signal from a reflective spot 15 on the cylindrical color filter assembly 20 for controlling the revolving speed of the step motor 11. The cylindrical color filter assembly 20 is strong in structural, and therefore it can be rotated at a high revolving speed. Instead of the step motor 11, a feedback type DC motor may be used to drive the cylindrical color filter assembly 20. As a feedback type DC motor is less expensive relative to a step motor, using a feedback type DC motor can reduce the cost of the cylindrical color filter driver.

Figure 6:
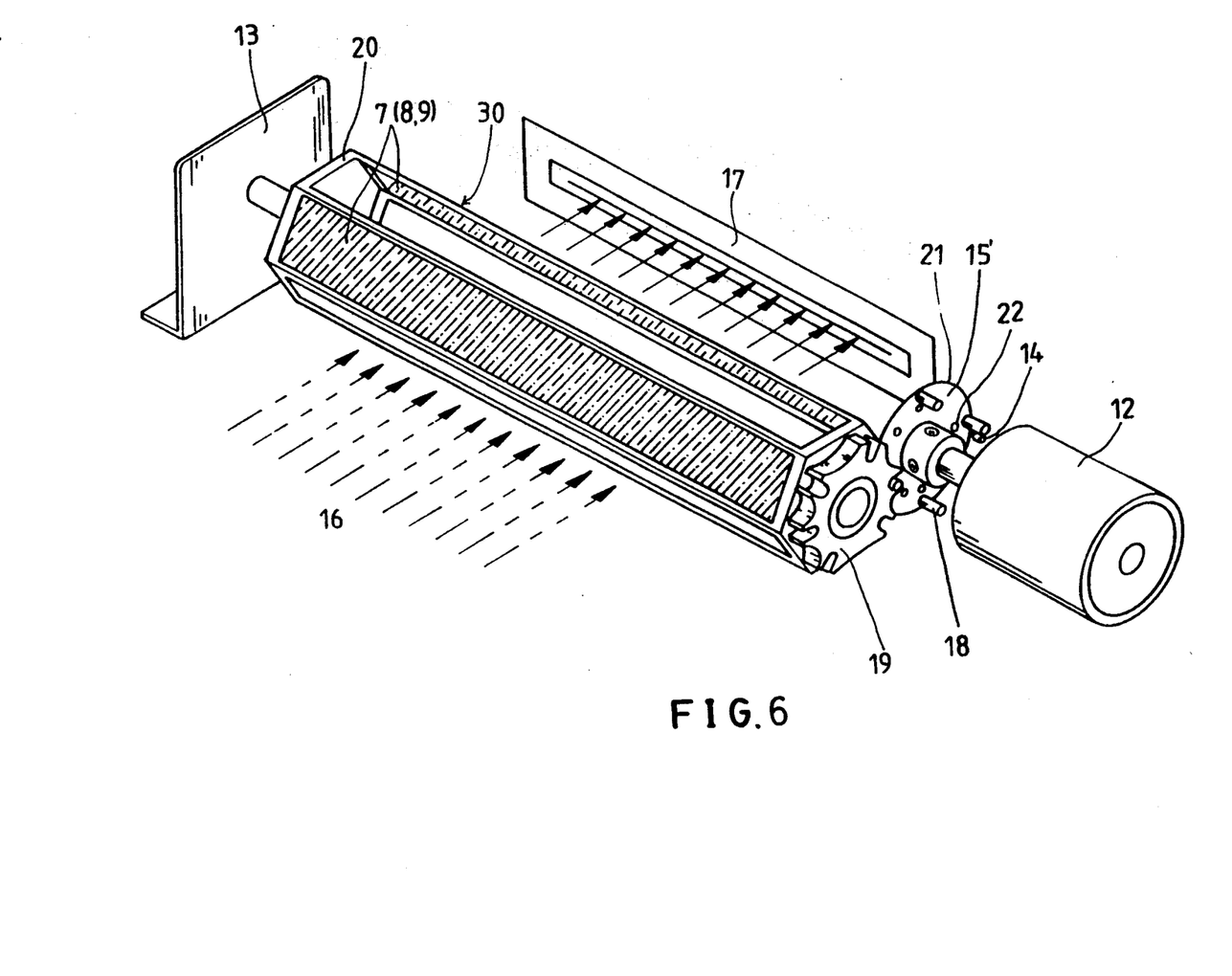
FIG. 6 illustrates an alternate form of the present invention in which a DC motor is used to drive the cylindrical color filter assembly.

FIG. 6 illustrates an alternate form of the present invention in which a feedback DC motor 12 is used to replace the step motor 11 in FIG. 5. The DC motor 12 is controlled to rotate a round disk 21, which has a plurality of driving pins 18 spaced on the same side around the periphery thereof. The cylindrical color filter assembly 20 has one end coupled with a Geneva gear 19 disposed adjacent to the round disk 21. Rotating the round disk 21 causes the Geneva gear 19 to be rotated by the driving pins 18, and therefore the cylindrical color filter assembly 20 is rotated. The revolving speed of the DC motor 12 is automatically controlled by the photoelectric position detector 14, which detects the position change of the grating dot (colored, reflective spot) 15' and other white spots 22 on the round disk 21. The Geneva gear 19 is an index change gear, which ensures the color filters of the cylindrical color filter assembly to be maintained at accurate angular positions relative to the document being scanned, and lets the direct contact time between the color filters and the light be increased to the maximum, and therefore the revolving speed and the scanning speed can be greatly improved.

Figure 7A:
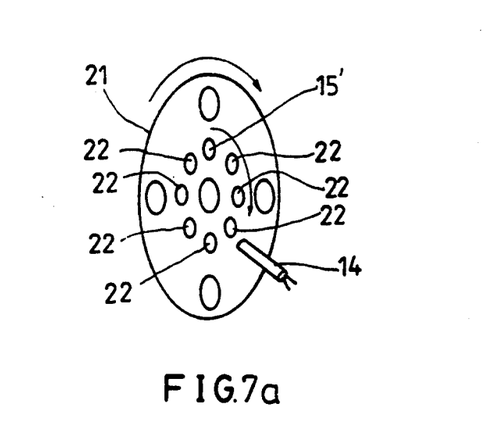
FIG. 7a illustrates the positioning and operation of the photoelectric position detector in the round disk rotated by the DC motor of FIG. 6.
Figure 7B:
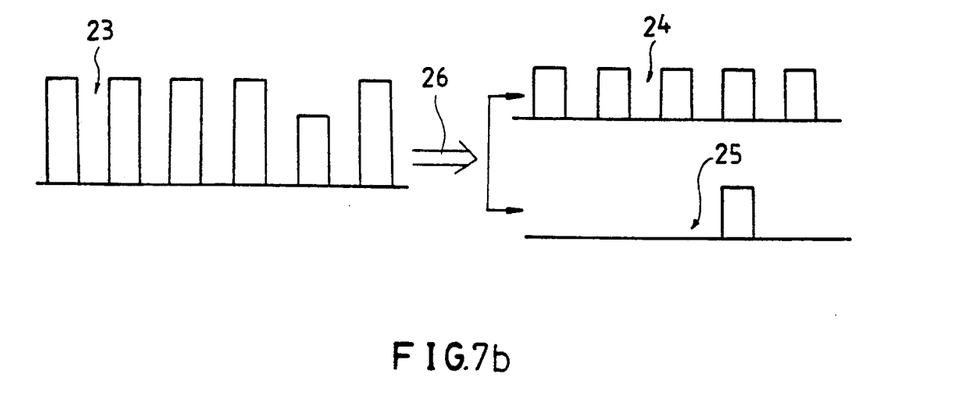
FIG. 7b illustrates the processing of the output signals of the photoelectric position detector.
Figure 7C:
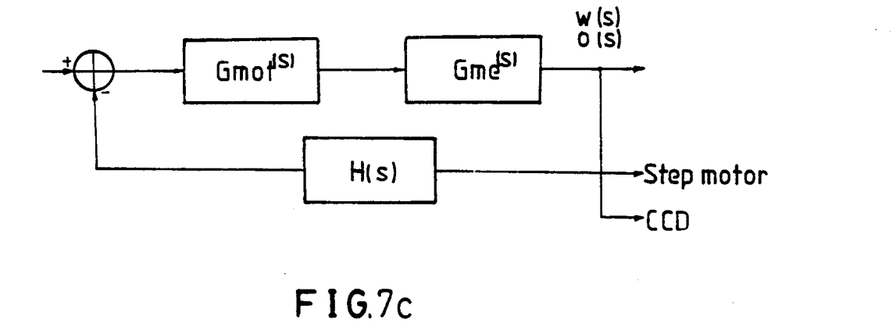
FIG. 7c is a control circuit block diagram of the photoelectric position detector.

FIGS. 7a, 7b and 7c illustrate the operation of the photoelectric position detector 14 in controlling the revolving speed of the cylindrical color filter assembly 20. As illustrated in FIG. 7a, the round disk 21 is marked with a grating dot 15' and a plurality of white spots 22 respectively arranged around a circle. The grating dot 15' is a reference spot. The white spots 22 are for improving the resolution of the feedback signal. As illustrated in FIG. 7b, output signals 23 from the photoelectric position detector 14 are treated through the process of signal separation 26 and turned into feedback signals 24 for controlling the revolving speed of the DC motor 12 and a signal 25 for detecting the absolute position (primary point, standard exposure time point, or start point for giving an instruction to operate the step motor). FIG. 7c illustrates the control block diagram of the cylindrical color filter driver in which Gmot(S) is the transfer function of the DC motor that is obtained according to the specifications of the DC motor; Gme(S) is obtained after the design of the color filter assembly; H(S) is the transfer function of the feedback circuit.

During the process of exposure, the color filter (red, blue or green) may not be maintained perpendicular to the light passing through. This question is explained hereinafter:

1) The occurrence of shift is caused by different refractive index, the amount of shift Δ is as:

$$\Delta = T \tan i1' - T \tan i1$$
$$= T \left( \frac{\sin i1'}{\sqrt{1 - \sin^2 i1'}} - \frac{\sin i1}{\sqrt{1 - \sin^2 i1}} \right)$$
$$\because \frac{\sin i1}{\sin i1'} = \frac{n1'}{n1} \because n1 = 1$$
$$\sin i1' = \frac{\sin i1}{n1'}$$

$$\Delta = T \sin i1 \left( \frac{1}{\sqrt{n1'^2 - \sin^2 i1}} - \frac{1}{\sqrt{1 - \sin^2 i1}} \right)$$

*to let $\Delta \to 0$  thus, $T \to 0$ or $i1 \to 0$ or $n1' \to$

If to let Δ be smaller than 0.004 m/m i.e. 6350 dpi=4×1600 dpi and n1'=1.5, i within±3°

$$0.004 = T \sin 3° \left( \frac{1}{\sqrt{1.5^2 - \sin^2 3°}} - \frac{1}{\sqrt{1 - \sin^2 3°}} \right) \times 2$$
$$= (1.035 - 0.6668) \times 0.052T \times 2$$
$$= 0.0641T$$
$$T = 0.103 \text{ mm},$$

this is the maximum tolerable thickness of the color filter.

The thickness of the color filters commonly in use is about 0.10 m/m. This shift problem can be eliminated by making the hexagonal cylinder color filter assembly into a cylinder.

2) The light transmission rate varies with the angular position of the color filter. However, the exposure of the CCD lasts a certain length of time. During the exposure, the color filter may be rotated from one angular position to another. The change in light transmission rate is about within 3.5% to 7.8%. This tolerance is acceptable and can be omitted.

Figure 8:
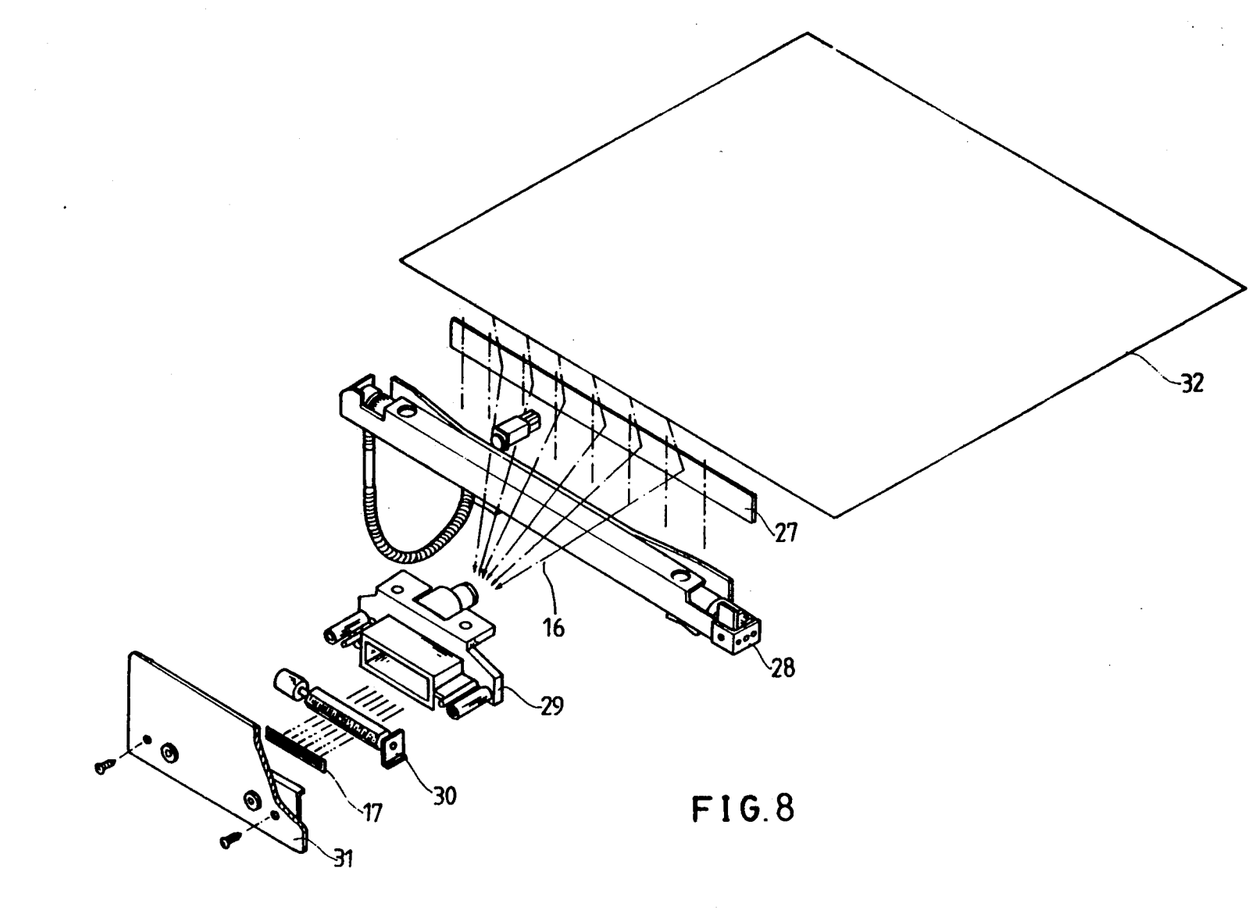
FIG. 8 illustrates the cylindrical color filter driver of the present invention installed in an optical reader.

Referring to FIG. 8, therein illustrated is the arrangement of an optical reader according to the present invention in which the numeral 27 designates a reflector, the numeral 28 designates a fluorescent lamp tube, the numeral 16 designates the route of the light rays, the numeral 29 designates an optical focusing system (lens assembly), the numeral 30 designates a cylindrical color filter driver according to the present invention, the numeral 17 designates a CCD (charge coupled device), the numeral 31 designates a CCD holder, and the numeral 32 designates a document to be read.

As indicated, the present invention is to provide a cylindrical color filter driver which utilizes a motor to rotate a cylindrical color filter assembly for the reproduction of colors, and which provides numerous advantages including accurate position and speed control, less installation space occupation, high scanning speed, high resolution, and low manufacturing cost.

It is to be understood that various modifications and changes could be made without departing from the scope of the invention and the invention is not deemed to be limited to what is shown in the drawings and described in the specification.

What is claimed is:

1. A color filter driver for an optical reader comprising:

a cylinder having six faces around the periphery and one end revolvably mounted on a locating plate and an opposite end coupled to an output shaft of a motor, the six faces including a first three faces and a second three faces, said first three faces being respectively covered with red, blue and green color filters and alternatively separated by said second three faces, said second three faces being opened or covered with transparent films and disposed opposite to said red, blue and green color filters respectively;

motor drive means having an output shaft coupled to said hexagonal cylinder and controlled to rotate it on said locating plate;

detector means to detect the revolving speed of said cylinder and send a feedback signal to said motor drive means in controlling the revolving speed of said motor drive means, and to detect a standard exposure point.

2. The color filter driver of claim 1 wherein said cylinder has differently colored reflective spots around an end edge thereof, which produce different reflective signals to said detector means as said cylinder was rotated by said motor drive means.

3. The color filter driver of claim 1 wherein said cylinders has apertures around an end edge thereof for letting light through, which produce signals to said detector means as said cylinder was rotated by said motor drive means.

* * * * *